(12) United States Patent
Sakakibara

(10) Patent No.: US 10,666,143 B2
(45) Date of Patent: May 26, 2020

(54) CONTROL DEVICE FOR DIRECT POWER CONVERTER

(71) Applicant: DAIKIN INDUSTRIES, LTD., Osaka-shi, Osaka (JP)

(72) Inventor: Kenichi Sakakibara, Osaka (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 0 days.

(21) Appl. No.: 16/620,730

(22) PCT Filed: Jun. 28, 2018

(86) PCT No.: PCT/JP2018/024578
§ 371 (c)(1),
(2) Date: Dec. 9, 2019

(87) PCT Pub. No.: WO2019/004354
PCT Pub. Date: Jan. 3, 2019

(65) Prior Publication Data
US 2020/0106359 A1   Apr. 2, 2020

(30) Foreign Application Priority Data
Jun. 30, 2017   (JP) .................................. 2017-128715

(51) Int. Cl.
*H02M 5/458*   (2006.01)
*H02M 3/158*   (2006.01)
*H02M 7/48*    (2007.01)

(52) U.S. Cl.
CPC ............. *H02M 3/158* (2013.01); *H02M 7/48* (2013.01)

(58) Field of Classification Search
CPC .................................................... H02M 5/458
See application file for complete search history.

(56) References Cited

U.S. PATENT DOCUMENTS 9,698,699 B2 *  7/2017  Yamashita .......... H02M 1/4225
9,780,683 B2    10/2017 Sakakibara et al.
(Continued)

FOREIGN PATENT DOCUMENTS

JP    2011-193678 A    9/2011
JP    2014-107935 A    6/2014
(Continued)

OTHER PUBLICATIONS

International Search Report (PCT/ISA/210) issued in PCT/JP2018/024578, dated Sep. 11, 2018.
(Continued)

*Primary Examiner* — Gary L Laxton
*Assistant Examiner* — Sisay G Tiku
(74) *Attorney, Agent, or Firm* — Birch Stewart Kolasch & Birch LLP

(57) ABSTRACT

A normalized-link-current estimation unit adopts a first value calculated by using a virtual DC voltage command, a phase and an amplitude of a single-phase AC voltage, and a distribution factor, as an estimated value of a value obtained by normalizing a link current flowing from a DC link to an inverter. A calculation unit determines a second value calculated by using the virtual DC voltage command, a rectified voltage, and a both-end voltage. When a normalized current command is less than a product of the first value and the second value, a normalized charge command is set to 0 and a rectifying duty is determined by dividing the normalized current command by the first value.

7 Claims, 9 Drawing Sheets

(56) References Cited

U.S. PATENT DOCUMENTS

| | | | |
|---|---|---|---|
| 9,837,929 | B2 | 12/2017 | Sakakibara |
| 9,887,658 | B2* | 2/2018 | Yamashita .............. H02M 7/12 |
| 9,906,156 | B2* | 2/2018 | Sakakibara ........... H02M 1/088 |
| 2015/0244282 | A1* | 8/2015 | Yamashita ........... H02M 1/4225 |
| | | | 363/35 |
| 2017/0201202 | A1* | 7/2017 | Yamashita .............. H02M 7/12 |
| 2017/0310235 | A1* | 10/2017 | Sakakibara ........... H02M 1/088 |
| 2017/0324348 | A1* | 11/2017 | Yamashita .............. H02M 1/08 |
| 2019/0222135 | A1* | 7/2019 | Sakakibara .............. H02M 1/12 |

FOREIGN PATENT DOCUMENTS

| | | | |
|---|---|---|---|
| JP | 5626435 | B2 | 11/2014 |
| JP | 5804167 | B2 | 11/2015 |
| JP | 5874800 | B1 | 3/2016 |
| JP | 5930108 | B2 | 6/2016 |

OTHER PUBLICATIONS

Yamashita et al., "A Control Method of a Single-phase-to-three-phase Power Converter with an Active Buffer for Increasing Voltage Transfer Ratio", IEEJ Transactions on Industry Applications, The Institute of Electrical Engineers of Japan, Feb. 1, 2017, vol. 136, No. 2, pp. 112-118.

* cited by examiner

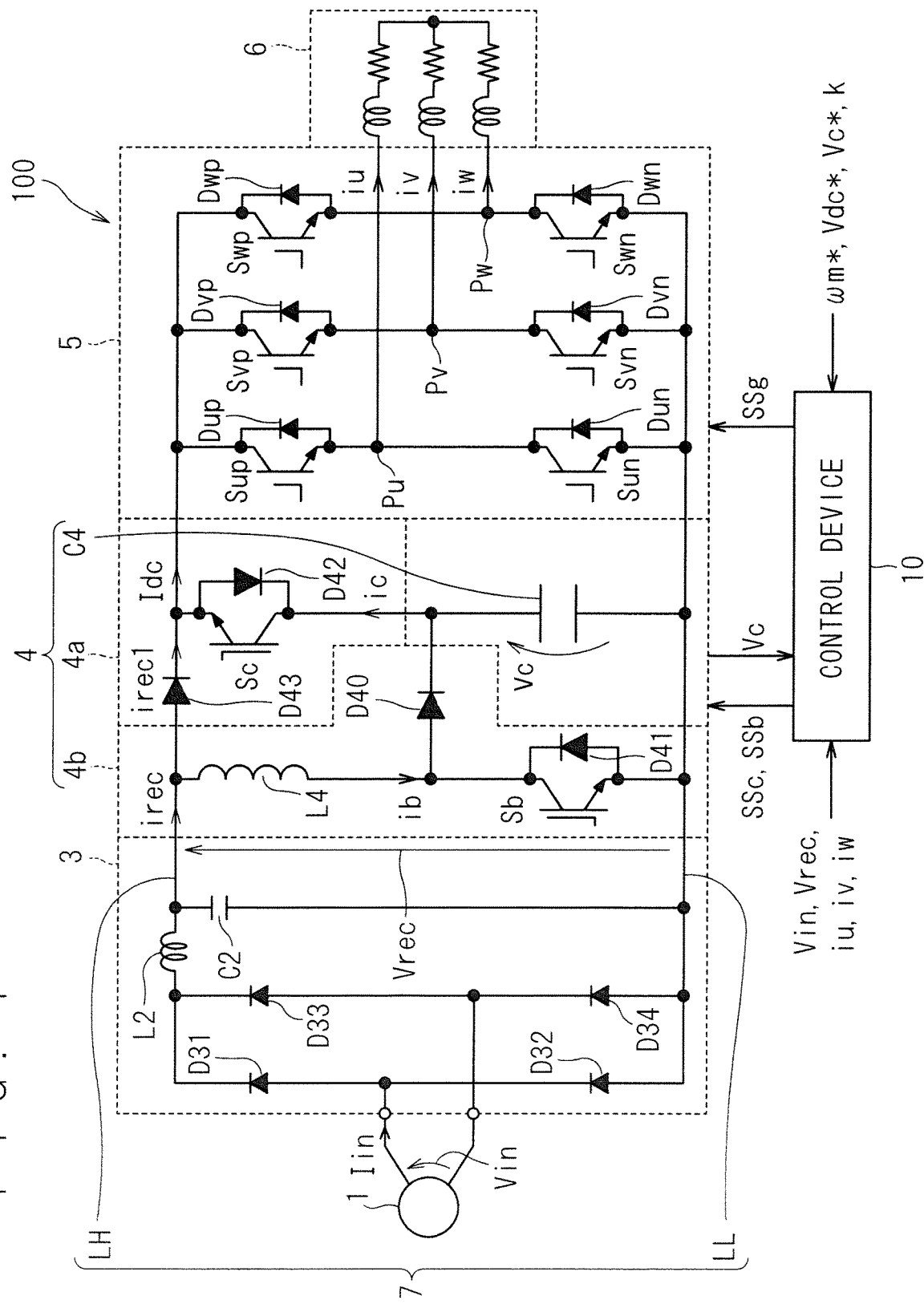
F I G. 1

F I G. 2
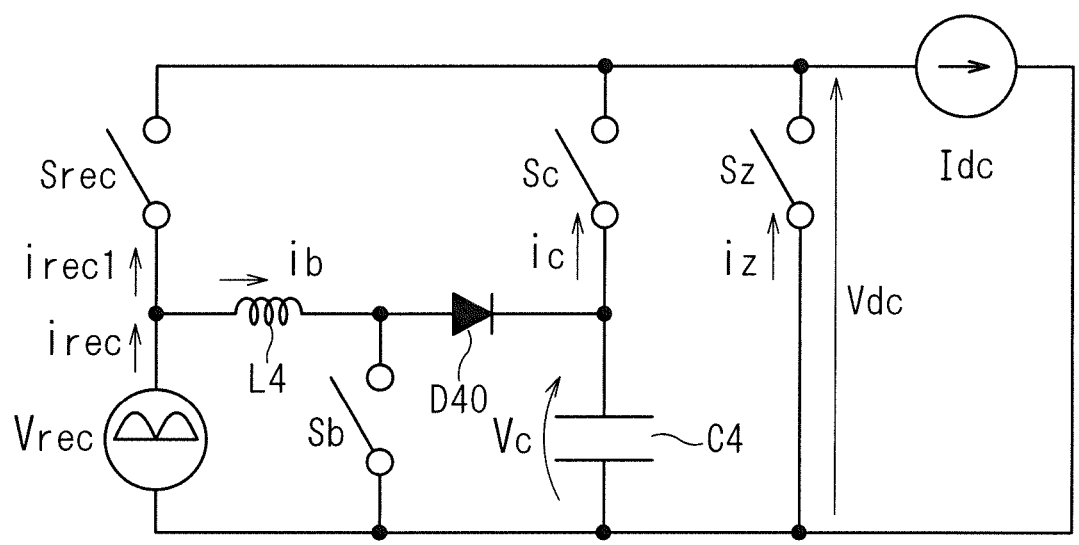

PHASE ωt (DEGREES)

F I G. 8
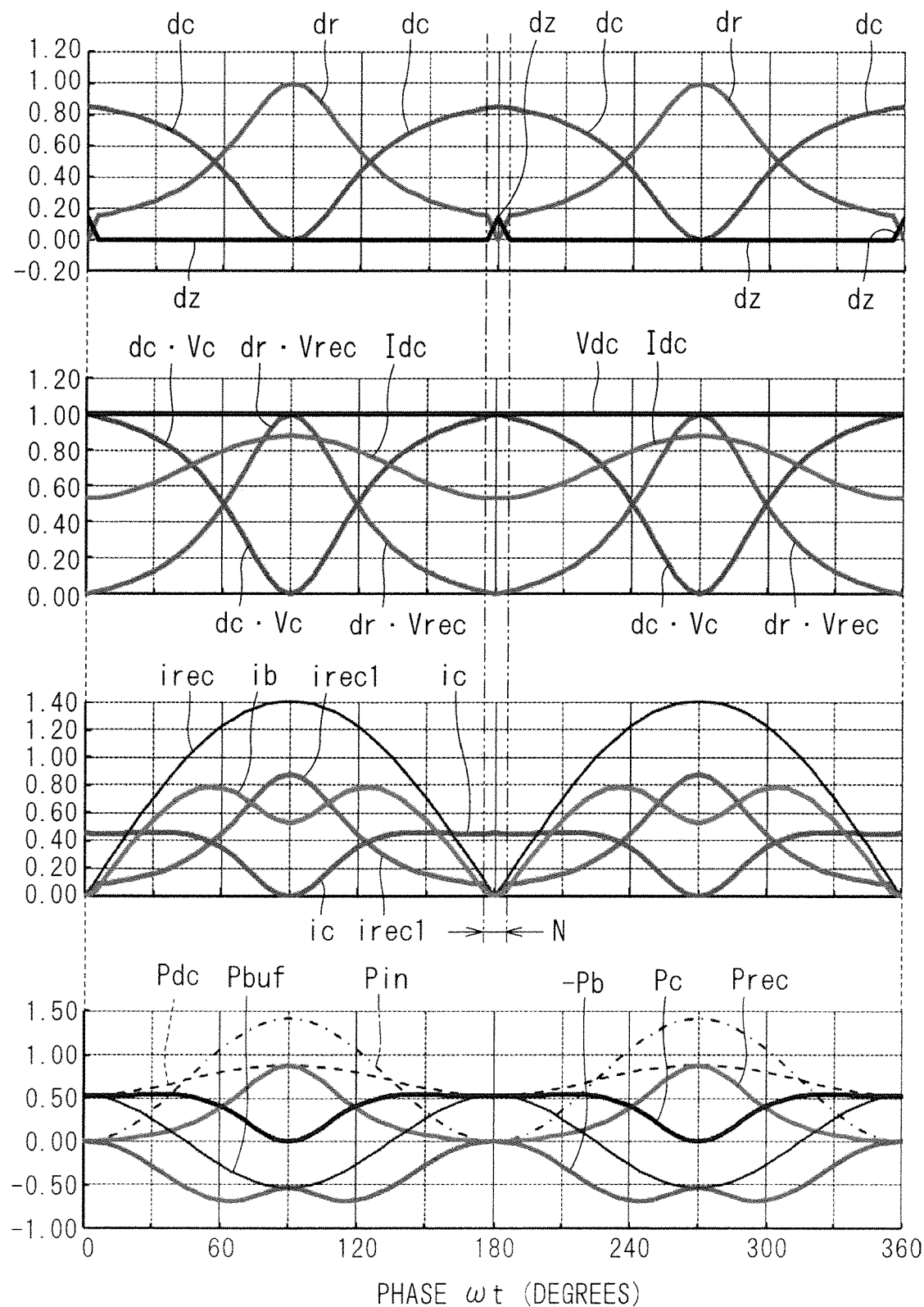

F I G. 9
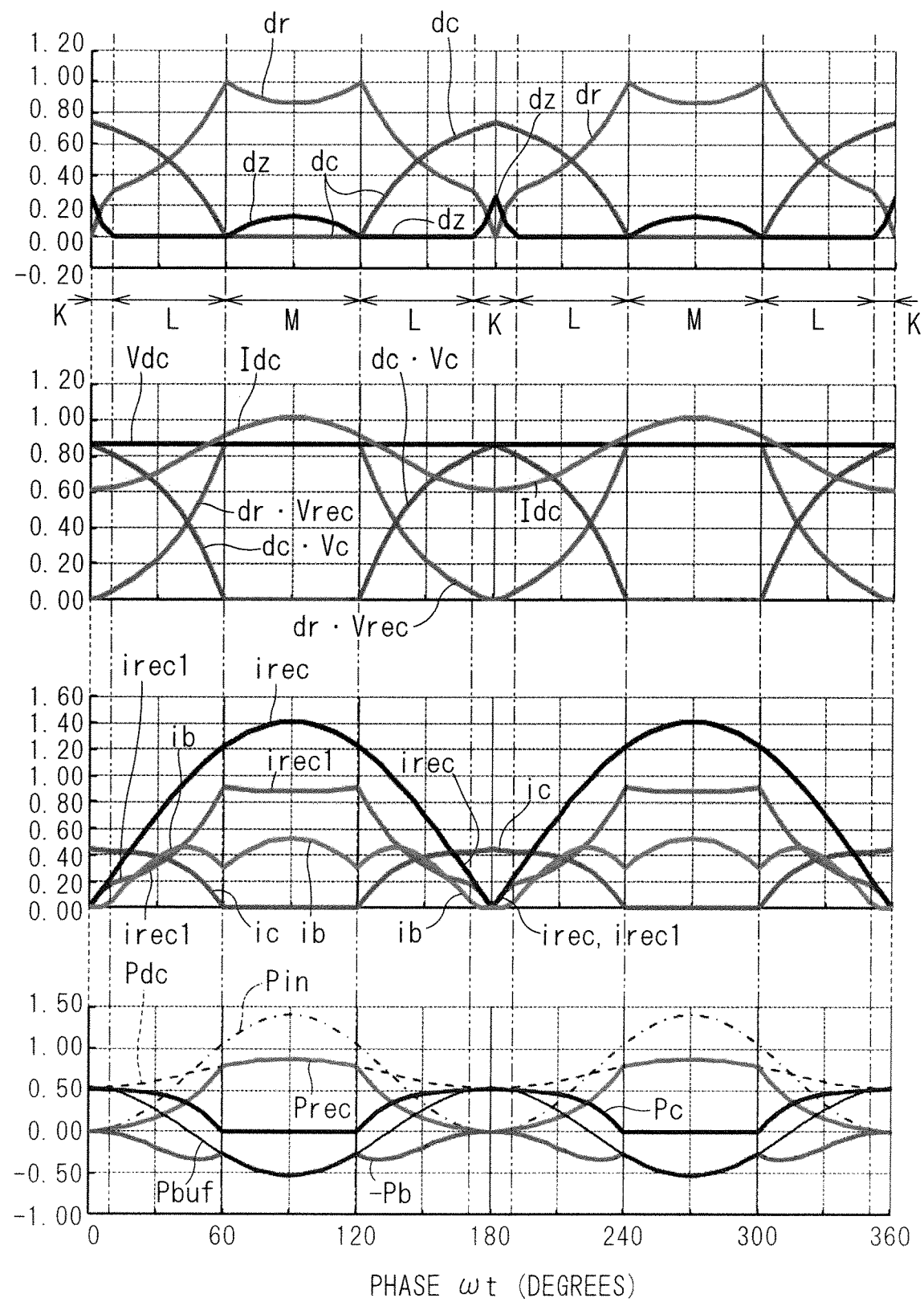

CONTROL DEVICE FOR DIRECT POWER CONVERTER

TECHNICAL FIELD

The present invention relates to a technique for controlling a direct power converter including a rectifying circuit, an inverter, and a power buffer circuit that are mutually connected through a DC link.

BACKGROUND ART

A ripple having a frequency twice a power source frequency is present in power obtained from a single-phase AC power source. Thus, when a DC voltage is obtained by rectifying a single-phase AC voltage obtained from the single-phase AC power source, a large-capacitance energy accumulation element is necessary to make this DC voltage constant.

In view of such a necessity, there has been proposed a technique that adopts a power buffer circuit in which a buffer capacitor is connected to a DC link via a switching element, thereby forming a voltage source (for example, Japanese Patent No. 580416 and Yamashita and Sakakibara, "A. Control Method of a Single-phase-to-three-phase Power Converter with an Active Buffer for Increasing Voltage Transfer Ratio", IEEJ Transactions on Industry Applications, Vol. 137, No. 2. The Institute of Electrical Engineers of Japan, Feb. 1, 2017, pp. 112-118 listed below). According to such a technique, the voltage source allows a current input to a direct power converter that forms a high-frequency link as well as a voltage obtained from a single-phase AC power source to have a waveform of a sinusoidal wave, implementing high-efficiency characteristics.

The technique described above enables a DC voltage of the DC link to be increased to a crest value of the single-phase AC voltage (for example, Yamashita and Sakakibara, "A Control Method of a Single-phase-to-three-phase Power Converter with an Active Buffer for Increasing Voltage Transfer Ratio", IEEJ Transactions on Industry Applications, Vol. 137, No. 2, The Institute of Electrical Engineers of Japan, Feb. 1, 2017, pp. 112-118). However, when a practical value, for example, a value that is 1.17 times the crest value, is selected as a buffer voltage allotted to the buffer capacitor, a voltage utilization ratio is only approximately 0.87. On the other hand, there has been proposed a control method that improves the voltage utilization ratio to 0.95 for the same buffer voltage (for example, Japanese Patent No. 5930108 listed below).

Unlike the above-described control methods based on a magnitude of power provided to and received from the power buffer circuit, a control method focused on a voltage output from a power converter has also been proposed (for example, Japanese Patent No. 5626435 and Yamashita and Sakakibara. "A Control Method of a Single-phase-to-three-phase Power Converter with an Active Buffer for Increasing Voltage Transfer Ratio", IEEJ Transactions on industry Applications, Vol. 137, No. 2, The Institute of Electrical Engineers of Japan, Feb. 1, 2017, pp. 112-118). This control method implements a boosting operation by increasing a ratio of steady-state power to power allotted to the power buffer circuit (power provided to or received from the DC link). Such a control method is effective in a voltage range in which the allotted power does not increase greatly.

In addition, examples that disclose a technique for controlling an amplitude of an input current on the basis of a buffer voltage include Japanese Patent No. 5874800.

SUMMARY OF INVENTION

Problems to be Solved by the Invention

In the control method described in Japanese Patent No. 5626435, power allotted to the power buffer circuit is passively determined by another factor. Specifically, the magnitude of the power allotted to the power buffer circuit is determined as a result of determining a current that flows through the power buffer circuit such that the input current is a sinusoidal wave. Although specific configuration is not shown, current detectors for detecting currents at various places are necessary to determine the current that flows through the power buffer circuit in the above-described manner, leading to complication of a control circuit.

The present invention has been made in view of the above-described situations, and an object is to provide a technique for eliminating the necessity of detecting a current in control of a power buffer circuit.

Means to Solve the Problems

A direct-power-converter control device according to the present invention is a control device (10) that controls a direct power converter. Here, the direct power converter includes a DC link (7) including a first power source line (LH) and a second power source line (LL); a rectifying circuit (3) that full-wave rectifies a single-phase AC voltage (Vin), makes the first power source line higher in potential than the second power source line, and outputs ripple power (Pin) to the DC link; a power buffer circuit (4) provided between the first power source line and the second power source line, the power buffer circuit performing buffering with buffering power (Pbuf) obtained by multiplying an AC component (Pin^) of the ripple power (Pin) by a distribution factor k that is greater than or equal to 0 and is less than or equal to 1; and an inverter (5) that converts a voltage applied to the DC link into an AC voltage. The power buffer circuit includes a capacitor (C4), a discharge circuit (4a) that causes the capacitor to discharge, and a charge circuit (4b) that charges the capacitor.

The direct-power-converter control device includes an inverter control unit (101), a normalized-current-command generation unit (102), and a buffer control unit (103).

The inverter control unit (101) outputs an inverter control signal (SSg) for controlling an operation of the inverter on the basis of a rectifying duty dr, a discharge duty dc, and a command value (Vu*, Vv*, Vw*) of a voltage to be output by the inverter. The rectifying duty dr is a duty in which the rectifying circuit is brought into conduction with the DC link. The discharge duty dc is a duty in which the capacitor discharges.

The normalized-current-command generation unit (102) generates and outputs a normalized current command (|sin(ωt)|). The normalized current command is a command value of a current obtained by normalizing an output current (irec) output by the rectifying circuit by an amplitude (Im) of an input current (Iin) input to the rectifying circuit.

The buffer control unit (103) includes an amplitude setting unit (103a), a charge command generation unit (103b), a charging operation control unit (103c), a discharging operation control unit (103d), a normalized-link-current estimation unit (103e), and a calculation unit (103f).

The amplitude setting unit (103a) sets an amplitude command (Im*) on the basis of a deviation between a both-end voltage command (Vc*) and a both-end voltage Vc of the capacitor. The both-end voltage command is a command value of an average value of the both-end voltage Vc. The amplitude command is a command value of the amplitude (Im) of the input current.

The charge command generation unit (103b) generates a charge command (ib*) by multiplying the amplitude command by a normalized charge command (ib*/Im*). The charge command is a command value of a current (ib) flowing through the charge circuit.

The charging operation control unit (103c) controls a charging operation of the charge circuit on the basis of the charge command. The discharging operation control unit (103d) causes the capacitor to discharge on the basis of the discharge duty dc.

The normalized-link-current estimation unit (103e) adopts and outputs a first value (J) as an estimated value (Idc^/Im*) of a value obtained by normalizing a link current (Idc) flowing from the DC link to the inverter by the amplitude (Im) of the input current. The first value (J) is calculated by using a virtual DC voltage command Vdc*, a phase ωt and an amplitude Vm of the single-phase AC voltage, and the distribution factor k.

The virtual DC voltage command Vdc* is a command value of a virtual DC voltage (Vdc). The virtual DC voltage (Vdc) is expressed by dr·Vrec+dc·Vc.

The calculation unit (103f) determines a second value (R) calculated by using the virtual DC voltage command Vdc*, a rectified voltage Vrec output by the rectifying circuit, and the both-end voltage Vc. When the normalized current command (|sin(ωt)|) is less than a product (R·J) of the first value and the second value, the calculation unit (103f) divides the normalized current command (|sin(ωt)|) by the first value (J) to determine a result and outputs the result as the rectifying duty dr, determines and outputs the discharge duty dc by using (Vdc*−dr·Vrec)/Vc, and sets the normalized charge command to 0 and outputs the normalized charge command.

Effects of the Invention

Detection of a current is not necessary in control of a power buffer circuit.

The objects, features, aspects, and advantages of the present invention will become more apparent from the following detailed description and the accompanying drawings.

BRIEF DESCRIPTION OF DRAWINGS

FIG. 1 is a circuit diagram showing configuration of a direct power converter to which a control technique described in this embodiment is to be applied-;

FIG. 2 is a circuit diagram showing an equivalent circuit of the direct power converter shown in FIG. 1;

FIGS. 6 to 9 are graphs showing waveforms of various quantities of the direct power converter.

DESCRIPTION OF EMBODIMENTS

A. Configuration of Power Converter

Figure 3:
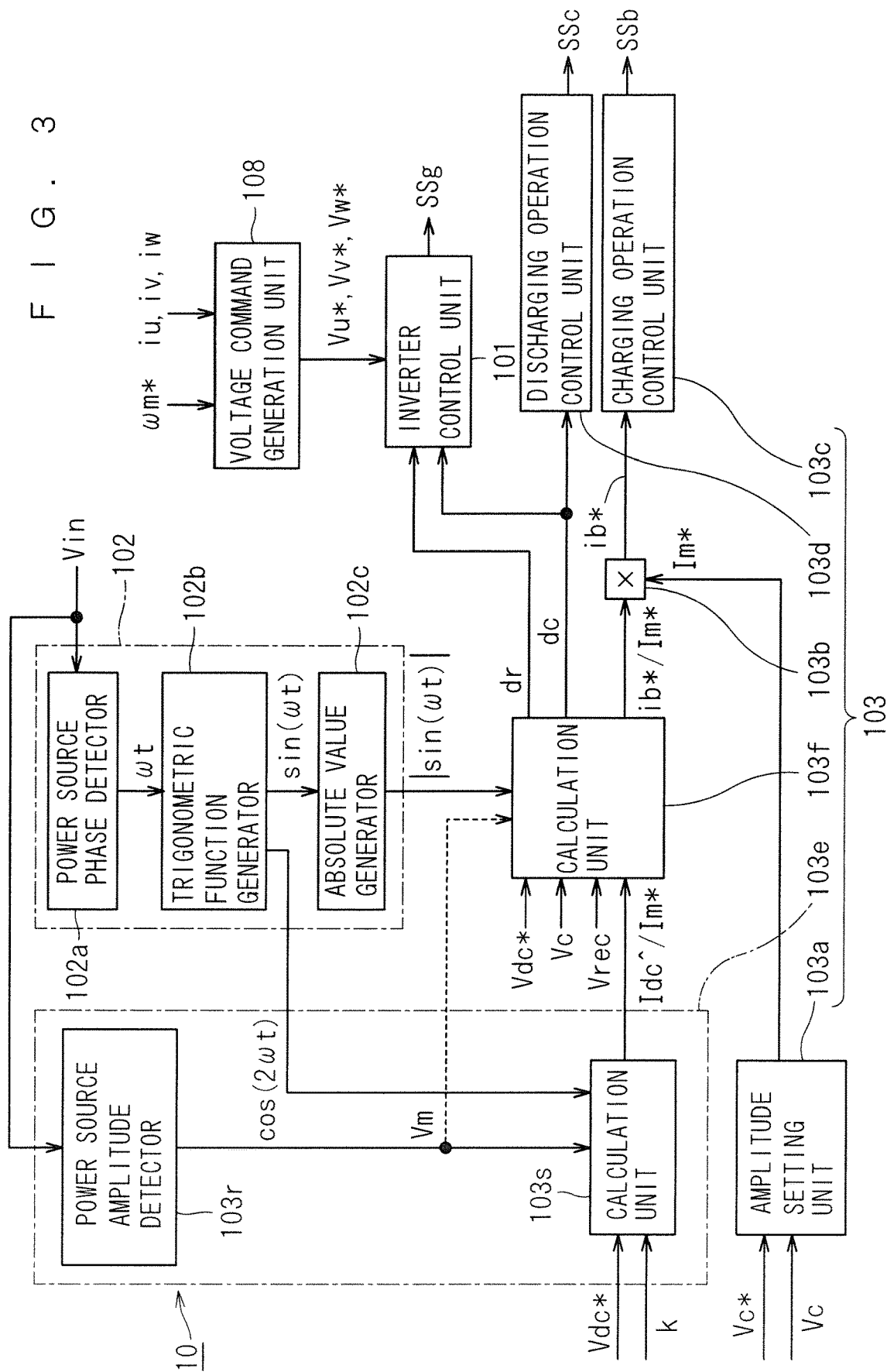
FIG. 3 is a block diagram showing an example of configuration of a control device.

FIG. 1 is a circuit diagram showing configuration of a direct power converter 100 to which a control technique described in this embodiment is to be applied. The detailed description of such configuration is omitted, being publicly known due to, for example, Yamashita and Sakakibara, "A Control Method of a Single-phase-to-three-phase Power Converter with an Active Buffer for Increasing Voltage Transfer Ratio", IEEJ Transactions on Industry Applications, Vol. 137, No. 2, The Institute of Electrical Engineers of Japan, Feb. 1, 2017. pp. 112-118, Japanese Patent No. 5804167, Japanese Patent No. 5930108, Japanese Patent No. 5626435 and Japanese Patent No. 5874800 mentioned above.

The direct power converter 100 includes a rectifying circuit 3, a power buffer circuit 4, an inverter 5, and a DC link 7. The DC link 7 includes power source lines LH and LL.

The rectifying circuit 3 is connected between a single-phase AC power source 1 and the DC link 7. The rectifying circuit 3 includes, for example, diodes D31 to D34, which form a diode bridge. The rectifying circuit 3 full-wave rectifies a single-phase AC voltage Vin input from the single-phase AC power source 1 to convert the single-phase AC voltage Vin into a rectified voltage Vrec (=|Vin|), and outputs the rectified voltage Vrec across the power source lines LH and LL. That is, the rectified voltage Vrec is an output voltage output by the rectifying circuit 3. The power source line LH has a higher potential than the power source line LL. An input current Iin is input to the rectifying circuit 3 from the single-phase AC power source 1, and the rectifying circuit 3 outputs an output current irec (=|Iin|). The rectifying circuit 3 outputs ripple power (detail of which will be described later) to the DC link 7.

Note that an example of a case where the rectifying circuit 3 includes a filter on the DC link 7 side is shown herein. The filter is an LC filter including a reactor L2 and a capacitor C2. The capacitor C2 is connected between the power source lines LH and LL. The reactor L2 is connected in series with the power source line LH to be closer to the diode bridge than the capacitor C2 is. The filter prevents a high-frequency component caused by a switching operation of the inverter 5 from propagating to the single-phase AC power source 1. The filter may be omitted. Since the function of the filter is ignorable in the embodiment below, the description will be given by omitting this function.

The power buffer circuit 4 has a function of buffering part of an AC component of the ripple power as buffering power. The power buffer circuit 4 includes a capacitor C4, a discharge circuit 4a, and a charge circuit 4b, and provides and receives power to and from the DC link 7. The capacitor C4 is a buffer capacitor. The discharge circuit 4a causes the capacitor C4 to discharge, and the charge circuit 4b charges the capacitor C4.

The discharge circuit 4a includes diodes D42 and D43. The discharge circuit 4a further includes a transistor (insulated gate bipolar transistor in this case: hereinafter abbreviated as "IGBT") Sc connected in antiparallel with the diode D42. The transistor Sc is connected in series with the capacitor C4 between the power source lines LH and LL to be closer to the power source line LH than the capacitor C4 is. Switching of the transistor Sc is controlled by a control signal SSc.

The antiparallel connection mentioned herein means parallel connection in which forward directions are opposite to each other. Specifically, the forward direction of the transistor Sc is a direction from the power source line LL to the power source line LH. The forward direction of the diode D42 is a direction from the power source line LH to the power source line LL. The transistor Sc and the diode D42 can be collectively regarded as one switch element (switch Sc). When the switch Sc is conducting, the capacitor C4 discharges and provides power to the DC link 7.

The diode D43 has a function of preventing discharging of the capacitor C4 from inducting charging of the capacitor C2. The diode D43 is a current blocking element that is an element that blocks a flow of the current from the switch Sc to the rectifying circuit 3 between the switch Sc and the rectifying circuit 3 in the power source line LH. When the rectifying circuit 3 does not include the filter on the DC link 7 side, the diode D43 can be omitted.

The charge circuit 4b boosts the rectified voltage Vrec and charges the capacitor C4. The charge circuit 4b includes, for example, a diode D40, a reactor L4, and a transistor (IGBT in this case) Sb. The diode D40 includes a cathode and an anode, and the cathode is connected between the switch Sc and the capacitor C4. Such configuration is known as a so-called boost chopper. Switching of the transistor Sb is controlled by a control signal SSb.

The reactor L4 is connected between the power source line LH and the anode of the diode D40. The transistor Sb is connected between the power source line LL and the anode of the diode D40. The transistor Sb is connected in antiparallel with a diode D41. The transistor Sb and the diode D41 can be collectively regarded as one switch element (switch Sb). Specifically, the forward direction of the transistor Sb is a direction from the power source line LH to the power source line LL, and the forward direction of the diode D41 is a direction from the power source line LL to the power source line LH.

The capacitor C4 is charged by the charge circuit 4b, and a voltage (hereinafter, referred to as a "both-end voltage") Vc higher than the rectified voltage Vrec is generated in the capacitor C4. Specifically, a current is caused to flow from the power source line LH to the power source line LL through the switch Sb, and consequently energy is accumulated in the reactor L4. Then, the switch Sb is turned OFF, and consequently the energy is accumulated in the capacitor C4 through the diode D40.

Since the both-end voltage Vc is higher than the rectified voltage Vrec, a current basically does not flow through the diode D42. Thus, whether the switch Sc is conducting or not depends solely on whether the transistor Sc is conducting or not. Here, the diode D42 ensures a reverse breakdown voltage when the both-end voltage Vc is lower than the rectified voltage Vrec, and brings a current flowing back from an inductive load 6 to the DC link 7 into reverse conduction when the inverter 5 abnormally stops.

In addition, since the power source line LH has a higher potential than the power source line LL, a current basically does not flow through the diode D41. Thus, whether the switch Sb is conducting or not depends solely on whether the transistor Sb is conducting or not. Here, the diode D41 is a diode that provides a reverse breakdown voltage and reverse conduction, and the diode D41 itself does not involve in operation of the circuit.

The inverter 5 converts a DC voltage across the power source lines LH and LL into an AC voltage, and outputs the AC voltage to output terminals Pu, Pv, and Pw. The inverter 5 includes six switching elements Sup, Svp, Swp, Sun, Svn, and Swn. The switching elements Sup, Svp, and Swp are connected between the output terminals Pu, Pv, and Pw, respectively, and the power source line LH. The switching elements Sun, Svn, and Swn are connected between the output terminals Pu, Pv, and Pw, respectively, and the power source line LL. The inverter 5 forms a so-called voltage source inverter, and includes six diodes Dup, Dvp, Dwp, Dun, Dvn, and Dwn.

Each of the diodes Dup, Dvp, Dwp, Dunm, Dvn, and Dwn is arranged such that a cathode thereof is directed toward the power source line LH and an anode thereof is directed toward the power source line LL. The diode Dup is connected in parallel with the switching element Sup between the output terminal Pu and the power source line LH. Likewise, the diodes Dlp, Dwp, Dun, Dvn, and Dwn are connected in parallel with the switching elements Svp, Swp, Sun, Svn, and Swn, respectively. Load currents in, iv, and iw are output from the output terminals Pu, Pv, and Pw, respectively, and form a three-phase AC current. For example, IGBTs are adopted as the switching elements Sup, Svp, Swp, Sun, Svn, and Swn. The inverter 5 operates on the basis of switching of the switching elements Sup, Svp, Swp, Sun, Svn, and Swn that are controlled by an inverter control signal SSg. That is, the inverter 5 is controlled by the inverter control signal SSg.

The inductive load 6 is, for example, a rotary machine, and is illustrated by an equivalent circuit representing an inductive load.

Measured values of the load currents iu, iv, and iw flowing through the inductive load 6, the single-phase AC voltage Vin, and the rectified voltage Vrec are input to a control device for a direct power converter (simply referred to as a "control device" hereinafter and in the drawings) 10. Note that input of the rectified voltage Vrec may be omitted as described later. In addition, a both-end voltage command Vc* that is a command value of an average value of the both-end voltage Vc, a distribution factor k described later, a virtual DC voltage command Vdc* that is a command value of a virtual DC voltage Vdc described later, and a command value regarding the operation of the inductive load 6 are input to the control device 10. When a rotary machine is adopted as the inductive load 6, the command value regarding the operation is a rotational angular velocity command ωm* that is a command value of a rotational angular velocity ωm of the rotary machine.

FIG. 2 is a circuit diagram showing an equivalent circuit of the direct power converter 100. The equivalent circuit itself is also introduced in, for example, Yamashita and Sakakibara. "A Control Method of a Single-phase-to-three-phase Power Converter with an Active Buffer for Increasing Voltage Transfer Ratio". IEEJ Transactions on Industry Applications. Vol. 137. No. 2. The Institute of Electrical Engineers of Japan. Feb. 1, 2017. pp. 112-118. Japanese Patent No. 5804167. Japanese Patent No. 5930108, Japanese Patent No. 5626435 and Japanese Patent No. 5874800. In the equivalent circuit, a current irec1 is shown equivalently as the current irec1 flowing through a switch Srec when the switch Srec is conducting. Likewise, a discharge current ic flowing out from the capacitor C4 when the capacitor C4 discharges is shown equivalently as the current ic flowing through the switch Sc when the switch Sc is conducting.

Note that conduction of the switch Srec means that the rectifying circuit 3 is brought into conduction with the DC link 7. When the switch Sc conducts, the both-end voltage Vc higher than the rectified voltage Vrec is applied to the DC link 7. Thus, the current irec1 does not flow and the switch Srec does not conduct.

A current flowing into the inductive load 6 through the inverter 5 when the output terminals Pu, Pv, and Pw are commonly connected to one of the power source lines LH and LL in the inverter 5 is shown equivalently as a zero-phase current iz flowing through a switch Sz when the switch Sz is conducting.

FIG. 2 further illustrates the reactor L4, the diode D40, and the switch Sb that are included in the charge circuit 4b. FIG. 2 additionally illustrates a reactor current ib that flows through the reactor L4.

In the equivalent circuit thus obtained, duties dr, dc, and dz in which the switches Srec, Sc, and Sz, respectively, are conducting are introduced. Note that as publicly known from the documents mentioned above, Formulas (1) to (4) below hold.

[Math 1]

$$0 \leq dr \leq 1 \ldots \quad (1)$$

[Math 2]

$$0 \leq dc \leq 1 \ldots \quad (2)$$

[Math 3]

$$0 \leq dz \leq 1 \ldots \quad (3)$$

[Math 4]

$$dr + dc + dz = 1 \ldots \quad (4)$$

The duty dr is a duty for setting a period in which the rectifying circuit 3 causes the current irec1 to flow through the DC link 7 and is hereinafter referred to as a rectifying duty dr. The rectifying duty dr can be said to be a duty in which the rectifying circuit 3 is brought into conduction with the DC link 7.

The duty dc is a duty in which the capacitor C4 discharges and is hereinafter referred to as a discharge duty dc.

The duty dz is a duty in which the zero-phase current iz always flows irrespective of the voltage output by the inverter 5 and is hereinafter referred to as a zero duty dz.

Since the currents irec1, ic, and iz are obtained by multiplying a DC link current Idc input to the inverter 5 from the DC link 7 by the duties dr, dc, and dz, respectively, the currents irec1, ic, and iz are average values in switching periods of the switches Srec, Sc, and Sz, respectively. The duties dr, dc, and dz can also be regarded as current distribution factors of the link current Idc to the currents irec1, ic, and iz, respectively.

The rectifying circuit 3 is incapable of actively causing the current irec1 to flow through the DC link 7. Thus, whether the switch Srec conducts or not is controlled by switching of the inverter 5 and the switch Sc in accordance with the zero duty dz and the discharge duty dc, respectively. In accordance with the control, the current irec1 can be obtained.

In a period in which the zero-phase current iz flows, the inverter 5 cannot utilize the DC voltage in the DC link 7. Thus, the DC voltage in the DC link 7 to be utilized in supplying power to the inverter 5 is significant in power conversion. In other words, the instantaneous DC voltage that is not used by the inverter 5 for power conversion is meaningless even when a voltage utilization ratio is considered. The DC voltage that is significant in power conversion is referred to as a virtual DC voltage Vdc in this embodiment and can be expressed by Formula (5) below. Since the third term of the right-hand side is equal to 0, the virtual DC voltage Vdc is expressed by a sum of a product Vrec·dr of the rectifying duty dr and the rectified voltage Vrec and a product Vc·dc of the discharge duty dc and the both-end voltage Vc.

[Math 5]

$$Vdc = Vrec \cdot dr + Vc \cdot dc + 0 \cdot dz \ldots \quad (5)$$

The virtual DC voltage Vdc can also be regraded as a voltage to be applied to the DC link 7 as an average value of the maximum values of the voltage that the inverter 5 can output in a period in which switching of the switches Sc and Sb and the inverter 5 is controlled. This is because the inverter 5 is insulated from one of the lines of the DC link 7 during a period corresponding to the zero duty dz, though the inverter 5 may contribute to the voltage in the DC link 7 at a ratio indicated by the zero duty dz.

In FIG. 2, the virtual DC voltage Vdc is additionally illustrated as a voltage generated across a current source Idc (that causes the link current Idc to flow) representing the inverter 5 and a load of the inverter 5.

B. Principle of Controlling Direct Power Converter

As indicated in Japanese Patent No. 5874800, instantaneous input power Pin input to the rectifying circuit 3 is expressed by Formula (6) with an input power factor of 1. Here, an amplitude Im of the input current Iin and a phase ωt and an amplitude Vm of the single-phase AC voltage Vin are introduced. Since the input power factor is set to 1, the phase ωt of the single-phase AC voltage Vin is adopted as the phase of the input current Iin.

[Math 6]

$$Pin = Vm \cdot Im \cdot \sin^2(\omega t) \quad (6)$$
$$= \frac{Vm \cdot Im}{2} - \frac{Vm \cdot Im}{2} \cdot \cos(2\omega t)$$

The instantaneous input power Pin includes an AC component $(-\frac{1}{2}) \cdot Vm \cdot Im \cdot \cos(2\omega t)$ (hereinafter, also referred to as an "AC component Pin^") represented by the second term of the right-hand side of Formula (6). Thus, the instantaneous input power Pin is also referred to as ripple power Pin. Since the rectifying circuit 3 does not have a function of accumulating and branching power, it can be said that the ripple power Pin is output from the rectifying circuit 3 to the DC link 7.

The power buffer circuit 4 performs buffering with buffering power Pbuf obtained by multiplying the AC component Pin^ by the distribution factor k that is greater than or equal to 0 and less than or equal to 1. In this way, the inverter 5 receives power expressed by Formula (7) from the DC link 7 and outputs the load currents iu, iv, and iw.

[Math 7]

$$Pdc = \frac{Vm \cdot Im}{2} - (1-k) \cdot \frac{Vm \cdot Im}{2} \cdot \cos(2\omega t) \quad (7)$$

That is, when k=0 holds, the inverter 5 receives the ripple power Pin as it is as input power Pdc from the DC link 7. This means Pbuf=0 holds, which corresponds to a case where no power is allotted to the power buffer circuit 4.

When k=1 holds, Pdc=Pin−Pin^ holds. This corresponds to a case where the power buffer circuit 4 provides and receives power equivalent to an absolute value |Pin^| of the AC component Pin^ to and from the DC link 7.

That is, the distribution factor k indicates how much the absolute value |Pin^| of the AC component Pin^ is to be distributed to the power buffer circuit 4 as the buffering power Pbuf.

By introducing such a distribution factor k, the link current Idc is expressed by Formula (8) (see, for example, Janese Patent No. 5874800).

[Math 8]

$$Idc = \frac{Pdc}{Vdc} = \frac{Vm \cdot Im}{2 \cdot Vdc}[1 - (1-k) \cdot \cos(2\omega t)] \quad (8)$$

(b-1) When Virtual DC Voltage Vdc is Greater Than Rectified Voltage Vrec

Formula (5) holds irrespective of the distribution factor k. Thus, to increase the virtual DC voltage Vdc, a period that does not contribute to power conversion by the inverter 5 is desirably decreased. Accordingly, first, a case where dz=0 can hold is assumed on the basis of Formula (3). A case where this does not hold will be described later. At that time, the rectifying duty dr and the discharge duty dc are expressed by Formulas (9) and (10) from Formulas (4) and (5). Since there is a relationship of Vc>Vdc>Vrec, 0<dr<1 and 0<dc<1 hold.

[Math 9]

$$dr = \frac{Vdc - Vc}{Vrec - Vc} \quad (9)$$

[Math 10]

$$dc = 1 - dr = \frac{Vrec - Vdc}{Vrec - Vc} \quad (10)$$

Since the rectifying duty dr is a ratio of the current irec1 to the link current Idc, Formula (11) holds by using Formula (9). In addition, since the input current Iin has a waveform of a sinusoidal wave, the output current irec is expressed by Formula (12). Further, Formula (13) holds with reference to FIG. 2. Therefore, Formula (14) is obtained also in consideration of Formula (8). For convenience in the following description, a first value J and a second value R are introduced in Formula (14).

[Math 11]

$$irec1 = \frac{Vdc - Vc}{Vrec - Vc} \cdot Idc \quad (11)$$

[Math 12]

$$irec = Im \cdot |\sin(\omega t)| \quad (12)$$

[Math 13]

$$irec = irec1 + ib \quad (13)$$

[Math 14]

$$\frac{ib}{Im} = |\sin(\omega t)| - R \cdot J \quad (14)$$

$$J = \frac{(Vm/2)}{Vdc}[1 - (1-k) \cdot \cos(2\omega t)]$$

$$R = \frac{Vdc - Vc}{Vrec - Vc}$$

The value ib/Im in the left-hand side of the first equation of Formula (14) is a value obtained by normalizing the reactor current ib by the amplitude Im. Since the reactor current ib is a current input to the charge circuit 4b, the value ib/Im is provisionally referred to as a normalized charge current. In addition, since the absolute value |sin(ωt)| can be said to be a command value of a current obtained by normalizing the current irec output by the rectifying circuit 3 by the amplitude Im, this is provisionally referred to as a normalized current command.

As is understood from Formula (14), the normalized current command |sin(ωt)| . . . , the first value J, and the second value R suffice to determine the normalized charge current ib/Im. The first value J is calculated by using the virtual DC voltage Vdc, the phase ωt, the amplitude Vm, and the distribution factor k. The second value R is calculated by using the virtual DC voltage Vdc, the rectified voltage Vrec, and the both-end voltage Vc. Thus, detection of a current is not necessary to determine the normalized charge current ib/Im.

As described later, a command value of the reactor current ib is required to obtain the control signal SSb for controlling the switch Sb, and even if the command value of the normalized charge current ib/Im is calculated, the amplitude Im of the input current Iin is required. However, it is not necessary to measure the amplitude Im because, for example, as described in Japanese Patent No. 5626435 and Japanese Patent No. 5874800, the command value of the amplitude Im is set on the basis of a deviation between the both-end voltage Vc and the both-end voltage command Vc*. Therefore, when the operation of the charge circuit 4b is controlled, a measured value of the both-end voltage Vc is required but detection of a current is not required.

Obviously, as is understood from Formula (10), the discharge duty dc for controlling the switch Sc is set to a value (1−R), which does not require detection of a current.

A case where dz=0 does not hold will be described next. This corresponds to a case where, as a result of the current irec1=Idc−ic calculated with dz=0 becoming large, the output current irec does not cover this current. In other words, this is a case where the right-hand side of the first equation of Formula (14) is negative. However, since the reactor current ib is non-negative in reality, the normalized charge current ib/Im should not be determined by using Formula (14).

Therefore, the rectifying duty dr and the discharge duty dc are set such that the reactor current ib does not flow (ib=0) and all the current irec1 is covered by the output current irec. In this way, a situation can be avoided where the zero duty dz is unnecessarily increased. Obviously, the normalized charge current ib/Im is set to 0 in this case.

The normalized charge current ib/Im is set to 0 in Formula (14), and the second value R is replaced with the rectifying duty dr in Formula (14) in consideration of Formula (9). Then, the rectifying duty dr is determined by using Formula (15).

[Math 15]

$$dr = \frac{|\sin(\omega t)|}{J} \quad (15)$$

That is, the rectifying duty dr in this case is determined by dividing the normalized current command $|\sin(\omega t)|$ by the first value J. When the phase $\omega t$ takes a value that satisfies $|\sin(\omega t)|=0$, dr=0 holds. That is, unlike the case where the reactor current ib flows, the rectifying duty dr can take a value of 0 in the case where the reactor current ib does not flow.

At that time, the discharge duty dc is determined by using Formula (16) on the basis of Formula (5) that does not depend on the reactor current ib.

[Math 16]

$$dc = \frac{Vdc - dr \cdot Vrec}{Vc} \quad (16)$$

At that time, the zero duty dz is expressed by Formula (17) from Formulas (4), (15), and (16).

[Math 17]

$$\begin{aligned} dz &= 1 - dr - dc \quad (17) \\ &= 1 - dr - \frac{Vdc - dr \cdot Vrec}{Vc} \\ &= \frac{1}{Vc}\left[(Vc - Vdc) + (Vrec - Vc) \cdot \frac{|\sin(\omega t)|}{J}\right] \\ &= \frac{Vc - Vrec}{Vc}\left[R - \frac{|\sin(\omega t)|}{J}\right] \end{aligned}$$

Therefore, in a situation where the right-hand side of the first equation of Formula (14) is negative, the zero duty dz takes a positive value (that is, dz=0 does not hold) by setting the rectifying duty dr and the discharge duty dc to Formulas (15) and (16), respectively.

(b-2) When Virtual DC Voltage Vdc is Less Than or Equal to Rectified Voltage Vrec In this case, dc=0 can hold in view of voltage on the basis of Formula (5). Further, since irec1=dr·Idc holds when the reactor current ib flows, the rectifying duty dr is not limited by the output current irec. Thus, in such a case, the rectifying duty dr is determined solely in view of voltage, that is, by using Formula (18). In addition, since dc=0 holds, dz=1−dr is obtained from Formula (4). When Vdc=Vrec holds, dr=1 and dz=0 are obtained.

[Math 18]

$$dr = \frac{Vdc}{Vrec} \quad (18)$$

Formula (19) is obtained in a manner similar to the manner in which Formula (14) above is derived from Formulas (8) and (9). Formula (19) is the same in form as Formula (14) in which a value of 0 is used instead of the both-end voltage Vc. That is, Formula (19) is obtained by adopting Vdc/Vrec as the second value R in Formula (14).

[Math 19]

$$\frac{ib}{Im} = |\sin(\omega t)| - R \cdot J \quad (19)$$
$$J = \frac{(Vm/2)}{Vdc}[1 - (1-k)\cdot\cos(2\omega t)]$$
$$R = \frac{Vdc}{Vrec}$$

A case where dc=0 does not hold will be described next. This corresponds to a case where the current irec1 calculated with dc=0 is not covered by the output current irec. In other words, this is a case where the right-hand side of the first equation of Formula (19) is negative. However, the reactor current ib is non-negative in reality, the normalized charge current ib/Im should not be determined by using Formula (19).

Therefore, the rectifying duty dr and the discharge duty dc are set such that the reactor current ib does not flow (ib=0) and all the current irec1 is covered by the output current irec. Obviously, the normalized charge current ib/Im is set to 0 in this case.

Thus, the rectifying duty dr, the discharge duty dc, and the zero duty dz are expressed by Formulas (15), (16), and (17), respectively, also in this case.

In the above manner, the control technique according to the embodiment eliminates the necessity of detecting a current in control of the power buffer circuit 4.

C. Example of Configuration of Control Device 10

FIG. 3 is a block diagram showing an example of configuration of the control device 10. The control technique described above can be implemented by the control device 10. Note that since control is performed such that the virtual DC voltage Vdc becomes a desired value, the virtual DC voltage command Vdc* that is a command value of the virtual DC voltage Vdc is adopted as the virtual DC voltage Vdc in calculations of Formulas (14), (15), and (16).

The control device 10 includes an inverter control unit 101, a normalized-current-command generation unit 102, a buffer control unit 103, and a voltage command generation unit 108.

The inverter control unit 101 outputs the inverter control signal SSg on the basis of the rectifying duty dr, the discharge duty dc, and voltage commands Vu*, Vv*, and Vw*. The voltage commands Vu*, Vv*, and Vw* are command values of voltages output by the inverter 5. The voltage command generation unit 108 generates the voltage commands Vu*, Vv*, and Vw* on the basis of the rotational angular velocity command $\omega m^*$ and the load currents iu, iv, and iw, and outputs the voltage commands Vu*, Vv*, and Vw*. The description of functions of the inverter control unit 101 and the voltage command generation unit 108 and configuration for implementing the functions being publicly known, is omitted herein.

The normalized-current-command generation unit 102 generates and outputs the normalized current command $|\sin(\omega t)|$. When the normalized current command $|\sin(\omega t)|$ is mentioned by using Formula (12), the normalized current command $|\sin(\omega t)|$ is described to be a command value of a current obtained by normalizing the output current irec by the amplitude Im of the input current Iin. However, since the value of the normalized current command |sin(ωt)| itself is a dimensionless value, the normalized current command |sin(ωt)| is not necessarily limitedly used in association with the current value as adopted in Formula (15).

The normalized-current-command generation unit 102 includes, for example, a power source phase detector 102a, a trigonometric function generator 102b, and an absolute value generator 102c. The power source phase detector 102a detects the phase ωt of the single-phase AC voltage Vin from the single-phase AC voltage Vin and outputs the phase ωt. The trigonometric function generator 102b generates a sine value sin(ωt) by using the phase ωt and outputs the sine value sin(ωt). The absolute value generator 102c calculates the absolute value of the sine value sin(ωt) to generate the normalized current command |sin(ωt)| and outputs the normalized current command |sin(ωt)|.

The buffer control unit 103 includes an amplitude setting unit 103a, a charge command generation unit 103b, a charging operation control unit 103c, a discharging operation control unit 103d, a normalized-link-current estimation unit 103e, and a calculation unit 103f.

The amplitude setting unit 103a sets an amplitude command Im* that is a command value of the amplitude Im, on the basis of a deviation between the both-end voltage command Vc* and the both-end voltage Vc. Generation of the amplitude command Im* from the deviation is implemented by performing proportional control or proportional integral control on the deviation. Note that the both-end voltage Vc is proportional to an integral value of the current with which the capacitor C4 is charged. Thus, it can be said that the amplitude setting unit 103a performs proportional control, or it can be said the amplitude setting unit 103a substantially performs proportional integral control.

The charge command generation unit 103b generates a charge command ib* that is a command value of the reactor current ib. The charge command generation unit 103b is, specifically, a multiplier and generates the charge command ib* by multiplying the amplitude command Im* by a normalized charge command that is a command value of the normalized charge current ib/Im.

In light of such a calculation, the normalized charge command is expressed by adopting a symbol "ib*/Im*" for convenience. That is, this symbol does not mean division. The symbol merely indicates that the symbol is a multiplicand with which the charge command ib* is obtained if the symbol is multiplied by the amplitude command Im*. Generation of the normalized charge command ib*/Im* will be described later.

The charging operation control unit 103c controls a charging operation of the charge circuit 4b on the basis of the charge command ib*. Specifically, the charging operation control unit 103c generates the control signal SSb. The detail of a function of such a charging operation control unit 103c and configuration for implementing the function, being publicly known (for example, Japanese Patent No. 562643), is omitted herein.

The discharging operation control unit 103d causes the capacitor C4 to discharge on the basis of the discharge duty dc. Specifically, the discharging operation control unit 103d generates the control signal SSc. The detail of a function of such a discharging operation control unit 103d and configuration for implementing the function, being publicly known, is omitted herein.

The normalized-link-current estimation unit 103e estimates a value obtained by normalizing the link current Idc flowing through the DC link 7 by the amplitude Im. In this estimation, it is not that the link current Idc is temporarily estimated and is then normalized by the amplitude Im. A value obtained by normalizing the link current Idc by the amplitude Im is estimated.

For convenience, this estimated value is expressed by adopting a symbol "Idc^/Im*". That is, this symbol does not mean division. The symbol merely indicates that the symbol is a multiplicand with which a value that is the estimated value Idc^ of the link current Idc is obtained if the symbol is multiplied by the amplitude command Im*. However, in the embodiment, it is not necessary to determine the estimated value Idc^ itself.

Such an estimated value Idc^/Im* is determined by using Formula (20) by assuming the virtual DC voltage command Vdc* and the amplitude command Im* as the virtual DC voltage Vdc and the amplitude Im, respectively, in Formula (8).

[Math 20]

$$\frac{Idc^\wedge}{Im*} = \frac{Vm}{2 \cdot Vdc*}[1 - (1-k) \cdot \cos(2\omega t)] \quad (20)$$

As comparison between Formulas (14) and (20) indicates, the estimated value Idc^/Im* is determined by using the first value J when the virtual DC voltage command Vdc* is adopted as the virtual DC voltage Vdc in Formula (14). This is because the direct power converter 100 is controlled such that the virtual DC voltage Vdc becomes the virtual DC voltage command Vdc*.

In other words, the normalized-link-current estimation unit 103e determines, by calculation, the first value J by using the virtual DC voltage command Vdc*, the phase ωt and the amplitude Vm of the single-phase AC voltage Vin, and the distribution factor k, and adopts and outputs this result as the estimated value Idc^/Im*.

The normalized-link-current estimation unit 103e includes a power source amplitude detector 103r and a calculation unit 103s. The power source amplitude detector 103r receives the single-phase AC voltage Vin to determine the amplitude Vm, and outputs this amplitude Vm. The calculation unit 103s receives the amplitude Vm, the virtual DC voltage command Vdc*, the distribution factor k, and a cosine value cos(2ωt), calculates the first value J by using these, and outputs the first value J as the estimated value Idc^/Im*.

FIG. 3 shows an example of a case where the cosine value cos(2ωt) is generated by the trigonometric function generator 102b. However, the calculation unit 103s may determine the cosine value cos(2ωt) by acquiring the phase ωt from the power source phase detector 102a.

The calculation unit 103f generates and outputs the normalized charge command ib*/Im*, the rectifying duty dr, and the discharge duty dc. In the case of Vdc>Vrec, when the right-hand side of the first equation of Formula (14) is non-negative, the calculation unit 103f outputs the second value R as the rectifying duty dr as is understood from comparison between Formulas (9) and (14). The calculation unit 103f also subtracts the second value R from 1 and outputs the result as the discharge duty dc. In the case of Vdc≤Vrec, when the right-hand side of the first equation of Formula (19) is non-negative, the calculation unit 103f sets the discharge duty dc to 0 and outputs the discharge duty dc, and outputs the second value R as the rectifying duty dr.

Note that when the second value R is calculated by using Formula (14) (when Vdc>Vrec holds) or Formula (19)

(when Vdc≤Vrec holds), the virtual DC voltage command Vdc* is adopted as the virtual DC voltage Vdc. This is because the direct power converter 100 is controlled such that the virtual DC voltage Vdc becomes the virtual DC voltage command Vdc*.

The normalized charge command ib*/Im* is calculated by using the normalized current command |sin(ωt)| and the first value J and the second value R that are obtained with Vdc=Vdc* in Formula (14) or Formula (19). Because of the necessity of performing such a calculation, the normalized current command |sin(ωt)| and the first value J serving as the estimated value Idc^/Im* are input to the calculation unit 103f from the absolute value generator 102c and the normalized-link-current estimation unit 103e, respectively. The calculation unit 103f determines, by calculation, the second value R by using the virtual DC voltage command Vdc*, the rectified voltage Vrec, and the both-end voltage Vc.

Because of the necessity of calculating the second value R, the both-end voltage Vc and the rectified voltage Vrec are input to the calculation unit 103f. Although these are both measured values, an estimated value may be calculated for the rectified voltage Vrec because the rectified voltage Vrec can be estimated as a product of the amplitude Vm and the normalized current command |sin(ωt)|. Thus, instead of receiving of the rectified voltage Vrec, the calculation unit 103f may obtain the amplitude Vm from the power source amplitude detector 103r (see a broken-line arrow in FIG. 3) and estimate the rectified voltage Vrec therein.

Therefore, when the normalized current command |sin (ωt)| is greater than or equal to the product R·J of the first value J and the second value R, the calculation unit 103f outputs the second value R as the rectifying duty dr, and determines the normalized charge command ib*/Im* by subtracting the product R·J from the normalized current command |sin(ωt)| and outputs the normalized charge command ib*/Im*. Note that the calculation unit 103f outputs, as the discharge duty dc, (1−R) in the case of Vdc>Vrec and a value of 0 in the case of Vdc≤Vrec.

Likewise, when the normalized current command |sin (ωt)| is less than the product R·J, the calculation unit 103f divides the normalized current command |sin(ωt)| by the first value J on the assumption that the virtual DC voltage command Vdc* is the virtual DC voltage Vdc in Formulas (15) and (16) to determine a result, and outputs the result as the rectifying duty dr. The calculation unit 103f outputs the discharge duty dc that is (Vdc*−dr·Vrec)/Vc, and outputs the normalized charge command ib*/Im* set to 0. At that time, a magnitude relationship between the virtual DC voltage command Vdc* and the rectified voltage Vrec does not matter.

Figure 4:
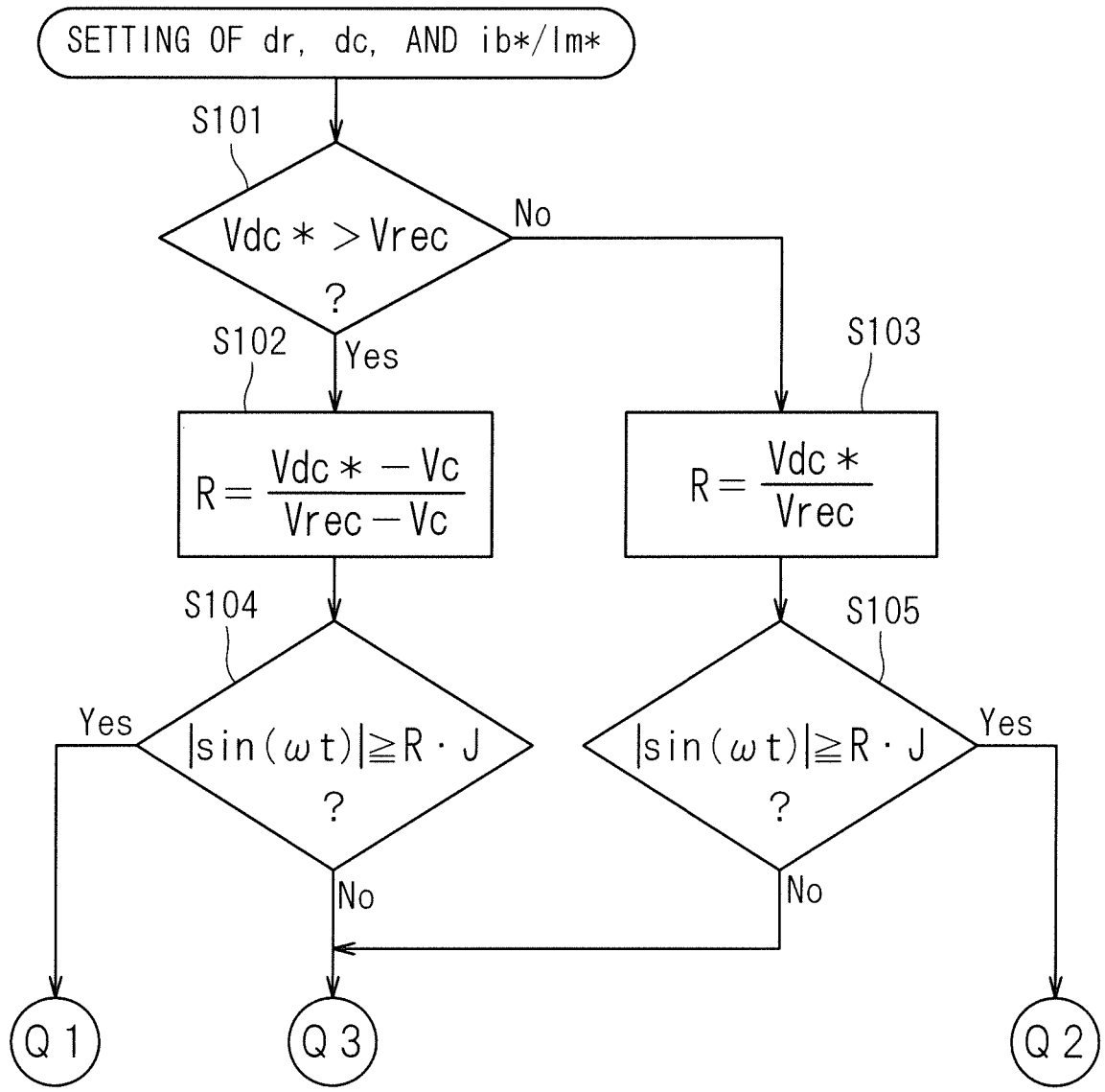
FIGS. 4 and 5 are flowcharts showing setting of a rectifying duty, a discharge duty, and a normalized charge command.
Figure 5:
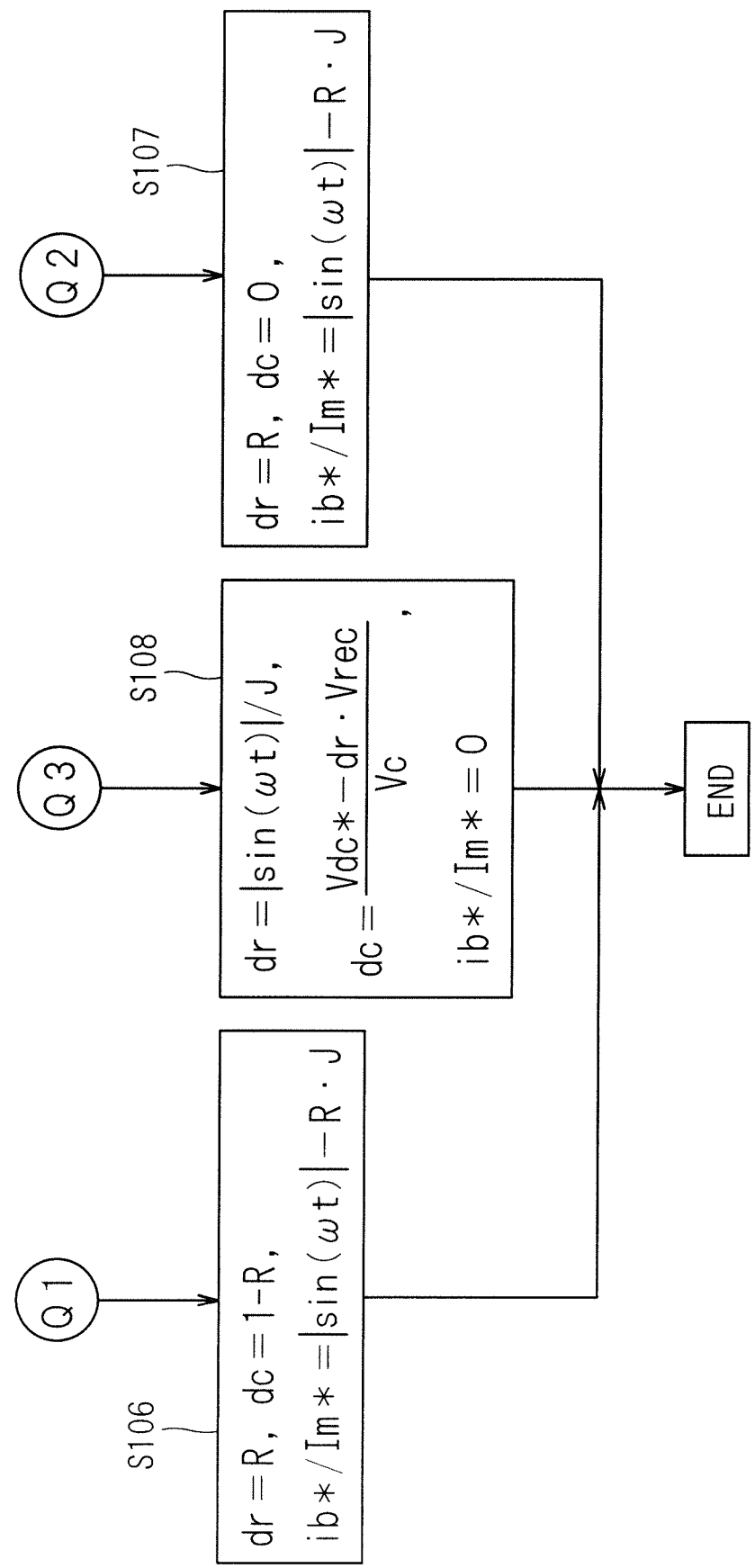

FIGS. 4 and 5 are flowcharts showing the above-described setting of the rectifying duty dr, the discharge duty dc, and the normalized charge command ib*/Im* by the calculation unit 103f. The flowchart shown in FIG. 4 and the flowchart shown in FIG. 5 are coupled to each other by couplers Q1, Q2, and Q3.

In step S101, it is determined whether or not the virtual DC voltage Vdc is greater than the rectified voltage Vrec. As described above, since the direct power converter 100 is controlled such that the virtual DC voltage Vdc becomes the virtual DC voltage command Vdc*, it is determined whether or not Vdc*>Vrec holds. In the following steps, the virtual DC voltage command Vdc* is adopted as the virtual DC voltage Vdc.

If the determination result in step S101 is positive, step S102 is performed. If the determination result is negative, step S103 is performed. The second value R is determined by performing a calculation in accordance with Formula (14) in step S102 or Formula (19) in step S103.

It is determined in step S104 whether or not the normalized current command |sin(ωt)| is greater than or equal to the product R·J by using the second value R determined in step S102. It is determined in step S105 whether or not the normalized current command |sin(ωt)| is greater than or equal to the product R·J by using the second value R determined in step S103.

If the determination result in step S104 is negative or if the determination result in step S105 is negative, the rectifying duty dr, the discharge duty dc, and the normalized charge command ib*/Im* are set in step S108. If the normalized current command |sin(ωt)| is less than the product R·J, the rectifying duty dr and the discharge duty dc are set in accordance with Formulas (15) and (16), respectively. In addition, the reactor current ib is not caused to flow, and the normalized charge command ib*/Im* is set to 0.

If the determination result in step S104 is positive, the rectifying duty dr, the discharge duty dc, and the normalized charge command ib*/Im* are set in step S106. Specifically, the rectifying duty dr is set to the second value R in accordance with Formulas (9) and (14). In addition, the normalized charge command ib*/Im* is set by using the normalized charge current ib/Im represented by Formula (14). The discharge duty dc is set to (1−R) in accordance with Formulas (10) and (14).

If the determination result in step S105 is positive, the rectifying duty dr, the discharge duty dc, and the normalized charge command ib*/Im* are set in step S107. Specifically, the rectifying duty dr is set to the second value R in accordance with Formulas (18) and (19). In addition, the normalized charge command ib*/Im* is set by using the normalized charge current ib/Im represented by Formula (19). The discharge duty dc is set to 0 as described above.

After any of steps S106, S107, and S108 is performed, setting of the rectifying duty dr, the discharge duty dc, and the normalized charge command ib*/Im* ends. The rectifying duty dr, the discharge duty dc, and the normalized charge command ib*/Im* thus set are output from the calculation unit 103f.

As described above, the control device 10 implements control of the power buffer circuit 4 described in "B. Principle of Controlling Direct Power Converter" above, by using the distribution factor k, the virtual DC voltage command Vdc*, the both-end voltage command Vc*, the single-phase AC voltage Vin, the both-end voltage Vc, and the rectified voltage Vrec. That is, detection of a current is no longer necessary in control of the power buffer circuit 4.

Although the example of the configuration of the control device 10 is shown by a block diagram in the above description, the control device 10 can be implemented by, for example, configuration including a microcomputer and a storage device. The microcomputer performs each processing step (procedure in other words) written in a program. The storage device can be constituted by one or a plurality of various storage devices such as, for example, a ROM (Read Only Memory), a RAM (Random Access Memory), and a rewritable nonvolatile memory (such as an EPROM (Erasable Programmable ROM)). The storage device stores various kinds of information, data, and the like, stores the program executed by the microcomputer, and provides a work area for executing the program. Note that the microcomputer can be regarded to function as various means corresponding to the respective processing steps written in the program or can be regarded to implement various functions corresponding to the respective processing steps.

Obviously, some or all of the constituents of the control device 10 shown in the block diagram can be implemented by hardware.

D. Embodiments

Embodiments of the control technique described above in various cases are described below.

(d-1) In Case of k=1

In this case, the power buffer circuit 4 provides and receives power equivalent to the absolute value |Pin^| to and from the DC link 7. In Formula (14), the first value J is equal to (Vm/2)/Vdc, and the estimated value Idc^/Im* is calculated to be (Vm/2)/Vdc* in the control device 10.

Thus, when the normalized current command |sin(ωt)| is greater than or equal to the product R·J (note that Vdc=Vdc* is adopted in calculation of the second value R), each value is expressed by Formula (21). When the normalized current command |sin(ωt)| less than the product R·J, each value is expressed by Formula (22).

[Math 21]

$$dr = R = \frac{Vdc* - Vc}{Vrec - Vc}$$
$$dc = 1 - R = \frac{Vrec - Vdc*}{Vrec - Vc}$$
$$ib*/Im* = |\sin(\omega t)| - \frac{Vm}{2 \cdot Vdc*} \cdot \frac{Vdc* - Vc}{Vrec - Vc}$$

(21)

[Math 22]

$$dr = \frac{2 \cdot Vdc*}{Vm} \cdot |\sin(\omega t)|$$
$$dc = \frac{Vdc*}{Vc} \cdot \cos(2\omega t)$$
$$ib*/Im* = 0$$

(22)

Figure 6:
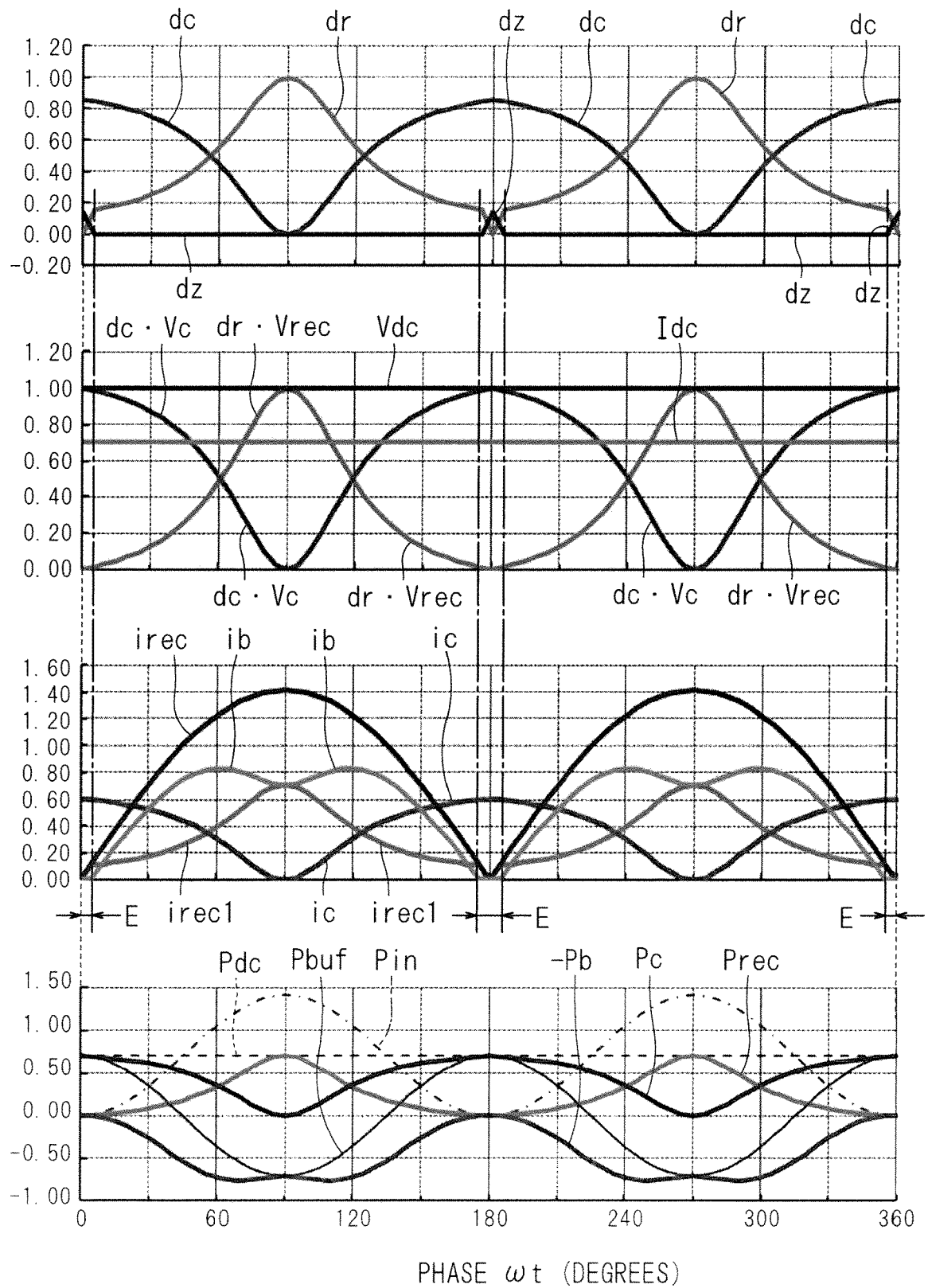

FIG. 6 shows graphs of waveforms of various quantities of the direct power converter 100 when k=1 holds and the virtual DC voltage command Vdc* is set equal to the amplitude Vm. Accordingly, Vdc=Vrec (see (b-2) above) holds when the phase ωt is equal to 90 degrees and 270 degrees; otherwise, Vdc>Vrec (see (b-1) above) holds.

In FIG. 6, the duties dr, dc, and dz are shown in a first tier. The virtual DC voltage Vdc, a first component dr·Vrec and a second component dc·Vc of the virtual DC voltage Vdc, and the link current Idc are shown in a second tier. The currents irec, irec1, ib, and is are shown in a third tier. Powers Pin, -Pb, Pc, Pbuf, and Prec are shown in a fourth tier. Here, the power Pc and the power Pb indicate power output to the DC link 7 from the power buffer circuit 4 and power input to the power buffer circuit 4 from the DC link 7, respectively, and have a relationship of Formula (23). Each of the graphs adopts the phase ωt in unit of "degrees" for the horizontal axis.

[Math 23]

$$Prec = Pin - Pb$$
$$Pbuf = Pc - Pb$$
$$Pdc = Prec + Pc$$
$$= Pin - Pb + Pc$$
$$= Pin + Pbuf$$

(23)

The first component dr·Vrec of the virtual DC voltage Vdc is a voltage that appears in the first term of the right-hand side of Formula (5) and indicates a contribution of the rectifying circuit 3 to the virtual DC voltage Vdc. The second component dc·Vc of the virtual DC voltage Vdc is a voltage that appears in the second term of the right-hand side of Formula (5) and indicates a contribution of the capacitor C4 to the virtual DC voltage Vdc.

FIG. 6 and FIGS. 7 to 9 described later show voltages that are normalized by the amplitude Vm (that is, Vm=1) and currents that are converted by setting the amplitude Im to √2. In addition, the both-end voltage command Vc* is set to 1.17 times the amplitude Vm (see, for example, Japanese Patent No. 5930108).

In periods E in which the value of the phase ωt is around 0, 180, and 360 (degrees), the first term of the right-hand side of the third equation of Formula (21) is small. Thus, dz>0 and ib=0 hold, and relationships of Formulas (15) to (17) are satisfied. In periods other than the periods E, dz=0 and ib>0 hold and relationships of Formulas (9), (10), and (14) are satisfied. Note that when the phase ωt is equal to 90 degrees and 270 degrees at which Vdc=Vrec holds, dc=0 holds and Formulas (18) and (19) are satisfied.

Figure 7:
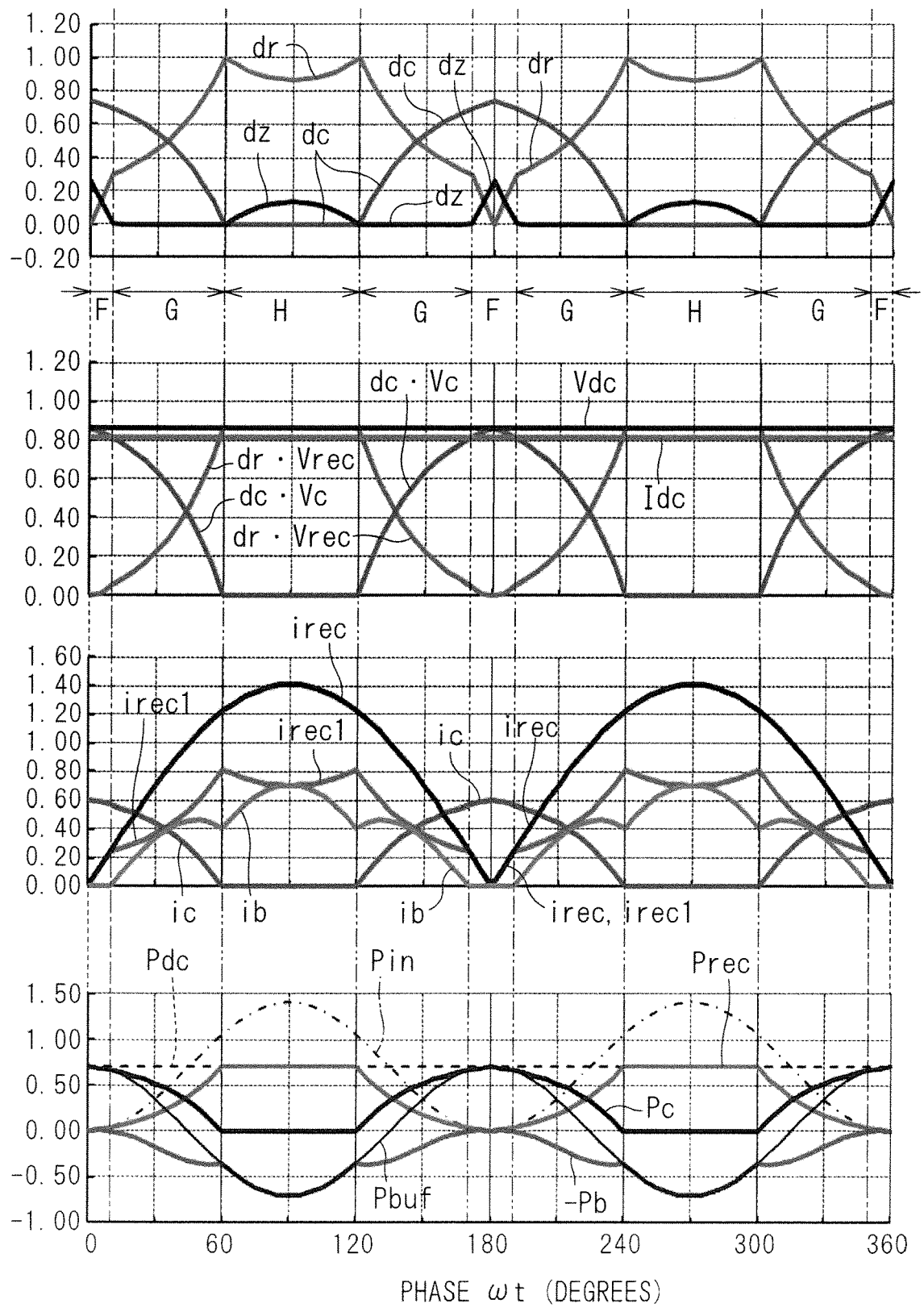

FIG. 7 shows graphs obtained when k=1 holds and the virtual DC voltage command Vdc* is set to √3/2(~0.87) times the amplitude Vm. Thus, in periods (including boundaries) in which the phase ωt is in 60 to 120 degrees and 240 to 300 degrees, Vdc≤Vrec (see (b-2) above) holds; otherwise, Vdc>Vrec (see (b-1) above) holds.

The periods in which Vdc Vrec holds are shown as periods H in FIG. 7. The periods in which Vdc>Vrec are each divided into a period F in which dz>0 and ib=0 hold corresponding to the periods E in FIG. 6, and a period G that is the rest of the period. The period G corresponds to a period excluding the periods E and time points at which the phase ωt is equal to 90 degrees and 270 degrees in FIG. 6.

Therefore, the relationships of Formulas (15) to (17) are satisfied in the period F, the relationships of Formulas (9), (10), and (14) are satisfied in the period G, and dc=0 holds and Formulas (18) and (19) are satisfied in the period H.

Since k=1 holds in both of the case shown in FIG. 6 and the case shown in FIG. 7, the current irec can have a waveform of a sinusoidal wave and each of the virtual DC voltage Vdc and the link current Idc can be set to a constant value (see Formula (8) or the like).

(d-2) In Case of k=¼

FIG. 8 shows graphs of waveforms of the various quantities of the direct power converter when k=¼ holds and the virtual DC voltage command Vdc* is set equal to the amplitude Vm. The various quantities are shown in the same manner as in FIG. 6. In addition, the both-end voltage command Vc* is set to 1.17 times the amplitude Vm.

In periods N in which the value of the phase ωt is around 0, 180, and 360 (degrees), the first term of the right-hand side of the third equation of Formula (21) is small. Thus, dz>0 and ib=0 hold, and relationships of Formulas (15) to (17) are satisfied. In periods other than the periods N, dz=0 and ib>0 hold and relationships of Formulas (9), (10), and (14) are satisfied. Note that when the phase ωt is equal to 90 degrees and 270 degrees at which Vdc=Vrec holds, dc=0 holds and relationships of Formulas (18) and (19) are satisfied.

FIG. 9 shows graphs obtained when k=¼ holds and the virtual DC voltage command Vdc* is set to √3/2 (~0.87) times the amplitude Vm. Thus, in periods (including boundaries) in which the phase ωt is in 60 to 120 degrees and 240 to 300 degrees, Vdc≤Vrec (see (b-2) above) holds; otherwise, Vdc>Vrec (see (b-1) above) holds.

The periods in which Vdc≤Vrec holds are shown as periods M in FIG. 9. The periods in which Vdc>Vrec are each divided into a period K in which dr>0 and ib=0 hold corresponding to the periods N in FIG. 8, and a period L that is the rest of the period. The period L corresponds to a period excluding the periods N and time points at which the phase ωt is equal to 90 degrees and 270 degrees in FIG. 8.

Therefore, the relationships of Formulas (15) to (17) are satisfied in the period K, the relationships of Formulas (9), (10), and (14) are satisfied in the period L, and dc=0 holds and Formulas (18) and (19) are satisfied in the period M.

In both of the case shown in FIG. 8 and the case shown in FIG. 9, the link current Idc ripples unlike in the case of k=1 (see FIG. 6) but the current irec can have a waveform of a sinusoidal wave and the virtual DC voltage Vdc can be set to a constant value.

It should be understood that various changes can be made in forms and details without departing from the essence and scope of the claims. The various embodiments and modifications described above can be combined with each other.

While the present invention has been described in detail, the foregoing description is in all aspects illustrative and not restrictive. It is therefore understood that numerous modifications that have not been described can be devised without departing from the scope of the present invention.

The invention claimed is:

1. A control device that controls a direct power converter, direct power converter, said direct power converter including a DC link including a first power source line and a second power source line, a rectifying circuit that full-wave rectifies a single-phase AC voltage, and outputs ripple power to said DC link, with said first power source line higher in potential than said second power source line, a power buffer circuit provided between said first power source line and said second power source line, said power buffer circuit performing buffering with buffering power obtained by multiplying an AC component of said ripple power by a distribution factor k that is greater than or equal to 0 and is less than or equal to 1, and an inverter that converts a voltage applied to said DC link into an AC voltage, said power buffer circuit including a capacitor, a discharge circuit that causes said capacitor to discharge, and a charge circuit that charges said capacitor, said control device comprising: an inverter control unit; a normalized-current-command generation unit; and a buffer control unit, wherein said inverter control unit outputs an inverter control signal for controlling an operation of said inverter on the basis of a rectifying duty dr, a discharge duty dc, and a command value of a voltage to be output by said inverter, said rectifying duty dr being a duty in which said rectifying circuit is brought into conduction with said DC link, said discharge duty dc being a duty in which said capacitor discharges, wherein said normalized-current-command generation unit generates and outputs a normalized current command, said normalized current command being a command value of a current obtained by normalizing an output current output by said rectifying circuit by an amplitude of an input current input to said rectifying circuit, wherein said buffer control unit includes an amplitude setting unit that sets an amplitude command on the basis of a deviation between a both-end voltage command and a both-end voltage Vc of said capacitor, said both-end voltage command being a command value of an average value of said both-end voltage Vc, said amplitude command being a command value of said amplitude of said input current, a charge command generation unit that generates a charge command by multiplying said amplitude command by a normalized charge command, said charge command being a command value of a current flowing through said charge circuit, a charging operation control unit that controls a charging operation of said charge circuit on the basis of said charge command, a discharging operation control unit that causes said capacitor to discharge on the basis of said discharge duty dc, a normalized-link-current estimation unit that adopts and outputs a first value as an estimated value of a value obtained by normalizing a link current flowing from said DC link to said inverter by said amplitude of said input current, said first value being calculated by using a virtual DC voltage command Vdc*, a phase ωt and an amplitude Vm of said single-phase AC voltage, and said distribution factor k, and a calculation unit that determines a second value calculated by using said virtual DC voltage command Vdc*, a rectified voltage Vrec output by said rectifying circuit, and said both-end voltage Vc, and, when said normalized current command is less than a product of said first value and said second value, divides said normalized current command by said first value to determine a result and outputs said result as said rectifying duty dr, determines and outputs said discharge duty dc by using (Vdc*−dr·Vrec)/Vc, and sets said normalized charge command to 0 and outputs said normalized charge command, and wherein said virtual DC voltage command Vdc* is a command value of a virtual DC voltage expressed by dr·Vrec+dc·Vc.

2. The control device according to claim 1, wherein said normalized-link-current estimation unit determines said first value by using ((Vm/2)/Vdc*)·(1−(1−k)·cos(2ωt)).

3. The control device according to claim 1, wherein when said normalized current command is greater than or equal to said product, said calculation unit outputs said second value as said rectifying duty dr, subtracts said product from said normalized current command, and outputs a result as said normalized charge command.

4. The control device according to claim 1, wherein when said virtual DC voltage command Vdc* is greater than said rectified voltage Vrec, said calculation unit determines said second value by using (Vdc*−Vc)/(Vrec−Vc), and when said normalized current command is greater than or equal to said product, subtracts said second value from 1 and outputs a result as said discharge duty dc.

5. The control device according to claim 1, wherein when said virtual DC voltage command Vdc* is less than or equal to said rectified voltage Vrec, said calculation unit determines said second value by using Vdc*/Vrec, and when said normalized current command is greater than or equal to said product, sets said discharge duty dc to 0 and outputs said discharge duty dc.

6. The control device according to claim 1, wherein said calculation unit estimates said rectified voltage Vrec by using a product of said amplitude Vm and said normalized current command.

7. The control device according to claim 1, wherein said rectifying circuit includes a filter on said DC link side, and wherein said discharge circuit further includes a switch provided in series with said capacitor between said first power source line and said second power source line, said switch being closer to said first power source line than said capacitor is, and a current blocking element in said first power source line between said switch and said rectifying circuit, said current blocking element blocking a flow of a current from said switch to said rectifying circuit.

* * * * *